(12) United States Patent
Marconnet et al.

(10) Patent No.: US 10,529,526 B2
(45) Date of Patent: Jan. 7, 2020

(54) CREEP RESISTANT ELECTRON EMITTER MATERIAL AND FABRICATION METHOD

(71) Applicant: General Electric Company, Schenectady, NY (US)

(72) Inventors: Andrew Marconnet, West Milwaukee, WI (US); Gregory A. Steinlage, West Milwaukee, WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/193,336

(22) Filed: Nov. 16, 2018

(65) Prior Publication Data
US 2019/0103243 A1 Apr. 4, 2019

Related U.S. Application Data

(63) Continuation-in-part of application No. 15/689,297, filed on Aug. 29, 2017.

(51) Int. Cl.

| | |
|---|---|
| *H01J 35/06* | (2006.01) |
| *H01J 9/04* | (2006.01) |
| *B32B 15/01* | (2006.01) |
| *B23K 9/007* | (2006.01) |
| *B23K 1/00* | (2006.01) |
| *B23K 20/02* | (2006.01) |
| *B23K 101/36* | (2006.01) |

(52) U.S. Cl.
CPC ............ *H01J 35/06* (2013.01); *B23K 1/0008* (2013.01); *B23K 9/007* (2013.01); *B23K 20/023* (2013.01); *B32B 15/01* (2013.01); *H01J 9/04* (2013.01); *B23K 2101/36* (2018.08)

(58) Field of Classification Search
CPC ............ H01J 35/06; H01J 35/101; H01J 35/32
See application file for complete search history.

(56) References Cited

U.S. PATENT DOCUMENTS

| | | | |
|---|---|---|---|
| 5,996,385 A | 12/1999 | Kecskes | |
| 7,545,089 B1 | 6/2009 | Falce et al. | |
| 8,831,178 B2 | 9/2014 | Lemaitre | |
| 2008/0170982 A1* | 7/2008 | Zhang | B82Y 10/00 423/447.3 |

OTHER PUBLICATIONS

Ives et al., "High Current Density—Long Life Cathodes for High Frequency Applications", Vacuum Electronics Conference (VEC), 2010 IEEE International, 2 pages.
Sheldon Cytron, "Recent Advances in High Density Tungsten Composite Processing", Technical Report ARAED-TR-93007, U.S. Army Armament Research, Development and Engineering Center, Picatinny Arsenal, New Jersey, Oct. 1993, 21 pages.

\* cited by examiner

*Primary Examiner* — Mark R Gaworecki
(74) *Attorney, Agent, or Firm* — Boyle Fredrickson, S.C.

(57) ABSTRACT

In the present invention, a flat emitter is formed from emitter material preforms shaped as thin sheets of the emitter material. These sheets are subjected to various levels and/or amounts of mechanical working during their initial formation and are bonded to one another to create a preform having the desired thickness. The preform including the bonded sheets is subsequently worked to shape the preform into the desired configuration for the emitter. The working of the sheets of emitter material utilized to create the preform and the working of the preform to form the emitter provide a highly creep-resistant emitter that significantly improves the operation and useful life of the resulting emitter.

20 Claims, 6 Drawing Sheets

CREEP RESISTANT ELECTRON EMITTER MATERIAL AND FABRICATION METHOD

CROSS REFERENCE TO RELATED APPLICATIONS

The present application claims priority as a continuation-in-part application of U.S. patent application Ser. No. 15/689,297, filed on Aug. 29, 2017, the entirety of which is hereby expressly incorporated herein by reference for all purposes.

BACKGROUND OF INVENTION

The invention relates generally to emitters for x-ray imaging systems and more particularly to improvements to the structures of emitters of this type.

Presently available medical x-ray tubes typically include a cathode assembly having an emitter and a cup. The cathode assembly is oriented to face an x-ray tube anode, or target, which is typically a annular metal or composite structure. The space between the cathode and anode is evacuated.

X-ray tubes typically include an electron source, such as a cathode, that releases electrons at high acceleration. Some of the released electrons may impact a target anode. The collision of the electrons with the target anode produces X-rays, which may be used in a variety of medical devices such as computed tomography (CT) imaging systems, X-ray scanners, and so forth. In thermionic cathode systems, a filament is included that may be induced to release electrons through the thermionic effect, i.e. in response to being heated. However, the distance between the cathode and the anode must be kept short so as to allow for proper electron bombardment. Further, thermionic X-ray cathodes typically emit electrons throughout the entirety of the surface of the emitter. Accordingly, it is very difficult to focus all electrons into a small focal spot.

X-ray systems typically include an x-ray tube, a detector, and a support structure for the x-ray tube and the detector. In operation, an imaging table, on which an object is positioned, is located between the x-ray tube and the detector. The x-ray tube typically emits radiation, such as x-rays, toward the object. The radiation typically passes through the object on the imaging table and impinges on the detector. As radiation passes through the object, internal structures of the object cause spatial variances in the radiation received at the detector. The data acquisition system then reads the signals received in the detector, and the system then translates the radiation variances into an image, which may be used to evaluate the internal structure of the object. One skilled in the art will recognize that the object may include, but is not limited to, a patient in a medical imaging procedure and an inanimate object as in, for instance, a package in an x-ray scanner or computed tomography (CT) package scanner.

X-ray tubes typically include a rotating anode structure for the purpose of distributing the heat generated at a focal spot. An x-ray tube cathode provides an electron beam from an emitter that is accelerated using a high voltage applied across a cathode-to-anode vacuum gap to produce x-rays upon impact with the anode.

Typically, the cathode includes one or more cylindrically wound filaments positioned within a cup for emitting electrons as a beam to create a high-power large focal spot or a high-resolution small focal spot, as examples. Imaging applications may be designed that include selecting either a small or a large focal spot having a particular shape, depending on the application.

In these prior art x-ray tubes, the wire(s) forming the filaments are formed of drawn wire formed into coiled shape to function as the emitter. The formation of the wire in a suitable drawing process provides sufficient deformation processing to the material in order to result in a creep resistance imparted through subsequent annealing of the material. This processing, in addition to other manners of strengthening the emitter material, such as carbide-, oxide-, and/or void-strengthening the emitter material, allows the wire to have significant resistance to creep as a result of the high operating temperatures for the emitter.

Conventional cylindrically wound filaments, however, emit electrons in a complex pattern that is highly dependent on the circumferential position from which they emit toward the anode. Due to the complex electron emission pattern from a cylindrical filament or wire, focal spots resulting therefrom can have non-uniform profiles that are highly sensitive to the placement of the filament within the cup. As such, cylindrically wound filament-based cathodes are required to be manufactured having their filament positioned with very tight tolerances in order to meet the exacting focal spot requirements in an x-ray tube.

In order to generate a more uniform profile of electrons toward the anode to obtain a more uniform focal spot, cathodes having an approximately flat emitter surface have been developed, a flat surface emitter (or a 'flat emitter') may be positioned within the cathode cup with the flat surface positioned orthogonal to the anode, such as that disclosed in U.S. Pat. No. 8,831,178, incorporated herein by reference in its entirety. In the '178 patent a flat emitter with a rectangular emission area is formed with a very thin material having electrodes attached thereto, which can be significantly less costly to manufacture compared to conventionally wound (cylindrical or non-cylindrical) filaments and may have a relaxed placement tolerance when compared to a conventionally wound filament.

In addition, recent developments in diagnostic x-ray tubes made it desirable to provide high emission at reduced tube voltages. For example in vascular x-ray tubes it is desirable to reduce tube voltages to 60 kV from the typical lower limit of 80 kV while ideally maintaining the power delivered to the target. For large focal spots, emission currents between 1000 mA and 1500 mA at 60 kV are desirable. For small focal spots, especially in fluoroscopic mode, emission currents up to 400 mA are desirable.

These current emitters are formed from rolled sheets of the emissive or emitter material. These sheets are formed from the same metals and/or materials utilized for the wound emitters, but are rolled into flat sheets instead of being drawn or worked into wires. These flat sheets are then cut into emitters having the desired shapes and configurations for use in x-ray tubes for more precise direction of the electrons from the emitters onto the anode/target for x-ray generation.

In rolling the material into the sheets, the amount of deformation created in the sheets is less than that created in the formation of the wires. As a result, the sheets formed of the emitter material do not have the same high temperature property benefit as found in the wound emitters. As such, under the high operating temperatures for the flat emitters, these emitters become subject to creep at lower accumulated operational times, thereby decreasing the life span of the flat emitter.

One prior art attempt to overcome this issue with flat emitters is disclosed in Falce et al, U.S. Pat. No. 7,545,089 entitled Sintered Wire Cathode, the entirety of which is expressly incorporated herein by reference for all purposes. In this reference, wires formed an emitter metal, i.e., tungsten, are wound about a bobbin and sintered in order to form the wires into a porous cathode structure including a number of desired uniform pores formed within the cathode structure as a result of the wire diameter and sintering parameters utilized.

However, the presence of the voids in the resulting porous cathode structure significantly limits the effectiveness of the cathode as a thermionic electron emitter including voids or pores in the emitter structure is detrimental to the desired emission of electrons from the emitter/cathode as well as the detrimental structural integrity impacts.

Accordingly, it is desirable to provide an emitter for an x-ray tube cathode having a flat, non-porous structure that includes yield strength, tensile strength and creep-resistance properties similar to that of wire formed or wound emitters.

BRIEF DESCRIPTION OF THE INVENTION

There is a need or desire for a flat emitter that has increased creep-resistance properties in order to improve the useful life of the flat emitter from that of fiat, rolled emitters. The above-mentioned drawbacks and needs are addressed by the embodiments described herein in the following description.

According to one exemplary aspect of the invention, a flat emitter is formed by the formation of emitter material performs formed of the emitter material, such as wires or any other the preforms that possess sufficient work history and performance attributes to achieve the creep resistance, e.g., doping and/or ion implantation into foils, into a unitary non-porous flat emitter structure. The preforms, e.g., wires, are formed with increased thermomechanical deformation properties, including but not limited to creep resistance, yield and tensile strength as a result of the manner of the formation of the emitter material or metal into the preform (s) that is transferred to the flat emitter formed from the preform material. To form the flat emitter, the preform(s) are encapsulated and subjected to sufficient a process that applies sufficient temperatures and pressure to increase the density of the preform into a solid component, rod, sheet plate, etc. without the presence of voids or pores in the resulting component. In forming the emitter in this manner, pressures applied in conjunction with the high temperatures, the beneficial creep resistance and other high temperature microstructure/morphology and thermomechanical deformation properties from the preform(s) are retained within the resulting component to provide the emitter with increased creep resistance and a consequently longer useful life in the x-ray tube.

According to another exemplary aspect of the invention, the flat emitter is formed from emitter material preforms shaped as thin sheets of the emitter material. These sheets are subjected to various levels and/or amounts of mechanical working during their initial formation and are bonded to one another to create a preform having the desired thickness. The preform including the bonded sheets is subsequently worked to shape the preform into the desired configuration for the emitter. The working of the sheets of emitter material utilized to create the preform and the working of the preform to form the emitter provide a highly creep-resistant emitter that significantly improves the operation and useful life of the resulting emitter.

According to another exemplary embodiment of the disclosure, an emitter with enhanced creep-resistant properties for an x-ray tube includes an assembly of wires having a defined creep resistance, each wire including at least one component formed of an electron emitter material, wherein the emitter does not include a work function lowering material.

According to another aspect of the disclosure, a method for forming an emitter with enhanced creep-resistant properties for an x-ray tube includes the steps of: providing a preform having a defined creep resistance, the preform including at least one component formed of an electron emitter material and subjecting the assembly of wires to a consolidation process to form an emitter.

According to a further aspect of the disclosure, a method for forming an emitter for an x-ray tube having enhanced creep-resistant properties includes the steps of providing a preform having a desired creep resistance, the preform including at least one component formed of an electron emitter material, subjecting the preform to a consolidation process to form a rod, slicing the rod to form a number of sheets; and cutting each of the number of sheets to form the emitter.

According to another exemplary embodiment of the disclosure, a method for forming an electron emitter with enhanced creep-resistant properties for an x-ray tube includes the steps of providing a plurality of planar sheets formed of an electron emitting material in an assembly and subjecting the assembly to a consolidation process to form the electron emitter.

According to a further exemplary embodiment of the disclosure, a method for forming an electron emitter for an x-ray tube having enhanced creep-resistant properties includes the steps of providing a plurality of sheets of an electron emitting material, joining the plurality of sheets to form an assembly, subjecting the assembly to a consolidation process to form an emitter material and shaping the emitter material to form the electron emitter.

According to still another exemplary embodiment of the disclosure, an electron emitter with enhanced creep-resistant properties for an x-ray tube includes an assembly of sheets having a defined creep-resistance, each sheet including at least one component formed of an electron emitting material.

It should be understood that the brief description above is provided to introduce in simplified folio a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The drawings illustrate the best mode presently contemplated of carrying out the disclosure. In the drawings.

DETAILED DESCRIPTION OF THE DRAWINGS

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to he understood that other embodiments may be utilized and that logical, mechanical, electrical and other changes may be made without departing from the scope of the embodiments. The following detailed description is, therefore, not to be taken in a limiting sense.

Figure 1:
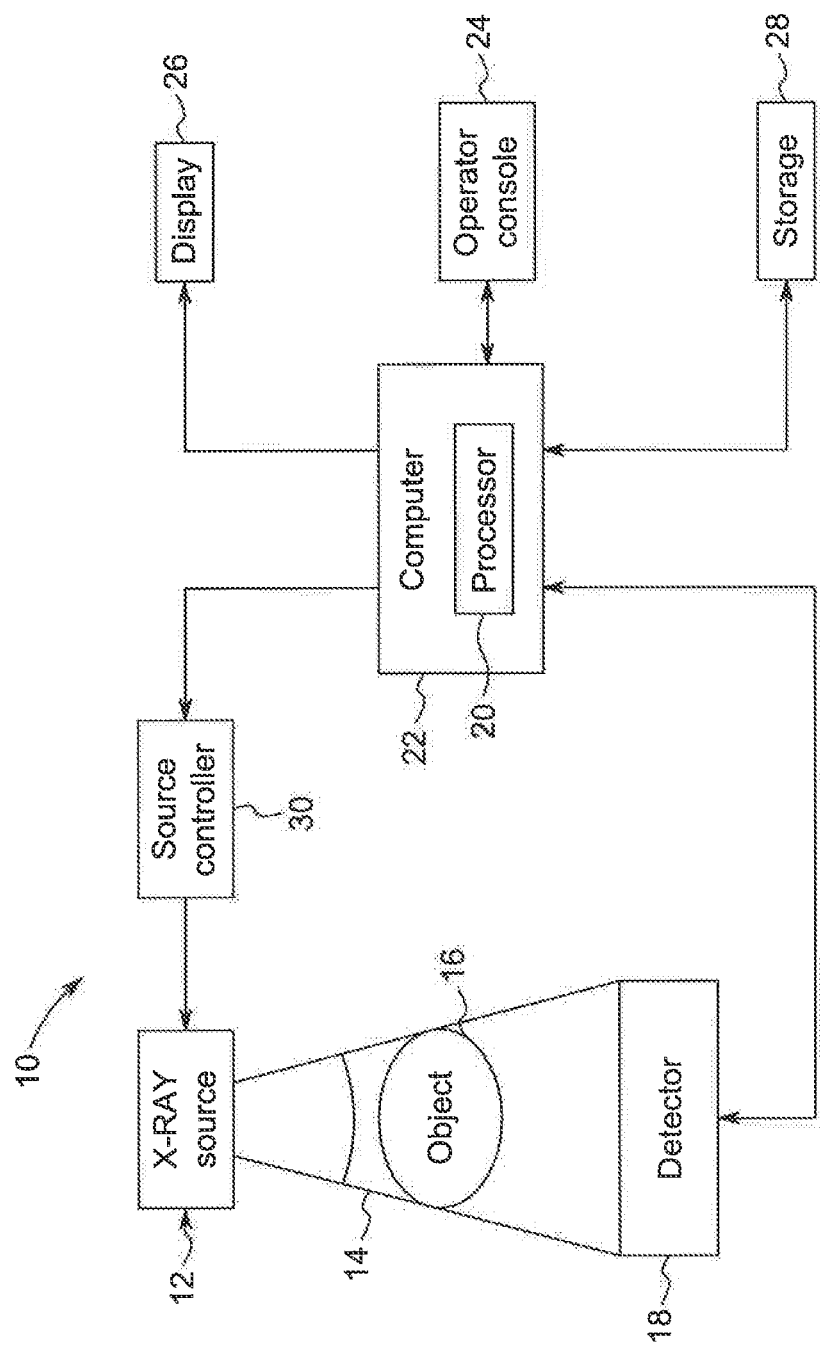
FIG. 1 is a block diagram of an imaging system according to an exemplary embodiment of the disclosure.

FIG. 1 is a block diagram of an embodiment of an imaging system 10 designed both to acquire original image data and to process the image data for display and/or analysis in accordance with embodiments of the invention. It will be appreciated by those skilled in the art that embodiments of the invention are applicable to numerous medical imaging systems implementing an x-ray tube, such as x-ray or mammography systems. Other imaging systems such as computed tomography (Cl) systems and digital radiography (RAD) systems, which acquire image three dimensional data for a volume, also benefit from embodiments of the invention. The following discussion of x-ray system 10 is merely an example of one such implementation and is not intended to he limiting in terms of modality.

As shown in FIG, 1, x-ray system 10 includes an x-ray source 12 configured to project a beam of x-rays 14 through an object 16. Object 16 may include a human subject, pieces of baggage, or other objects desired to be scanned. X-ray source 12 may be a conventional x-ray tube producing x-rays having a spectrum of energies that range, typically, from 30 keV to 200 keV. The x-rays 14 pass through object 16 and, after being attenuated by the object, impinge upon a detector 18. Each detector in detector 18 produces an analog electrical signal that represents the intensity of an impinging x-ray beam, and hence the attenuated beam, as it passes through the object 16. In one embodiment, detector 18 is a scintillation based detector, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, flash memory, compact discs, etc. The operator may also use console 24 to provide commands and instructions to computer 22 for controlling a source controller 30 that provides power and timing signals to x-ray source 12.

Figure 2:
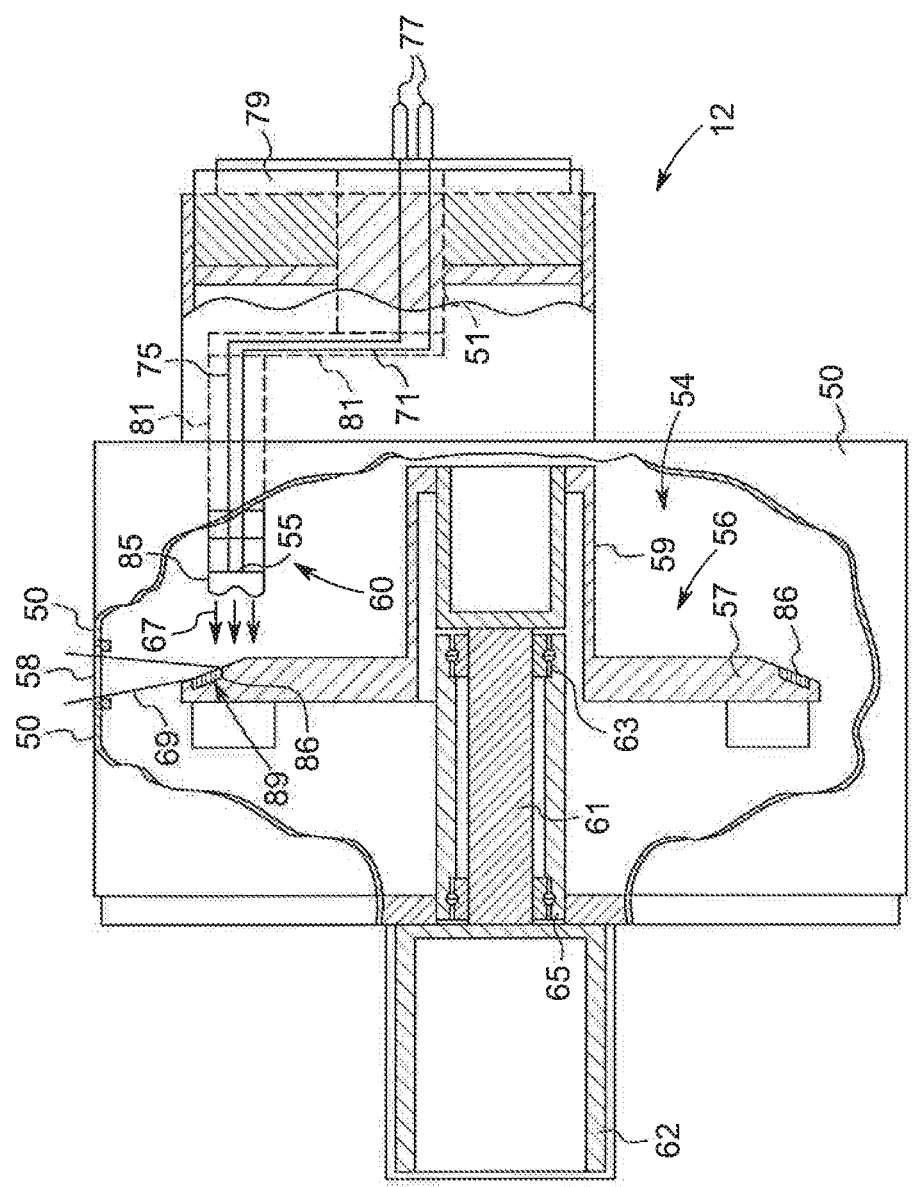
FIG. 2 is a cross-sectional view of an x-ray tube according to an exemplary embodiment of the disclosure.

FIG. 2 illustrates a cross-sectional view of an x-ray tube 12 incorporating embodiments of the invention. X-ray tube 12 includes a frame 50 that encloses a vacuum region 54, and an anode 56 and a cathode assembly 60 are positioned therein. Anode 56 includes a target 57 having a target track 86, and a target huh 59 attached thereto. Terms "anode" and "target" are to be distinguished from one another, where target typically includes a location, such as a focal spot, wherein electrons impact a refractory metal with high energy in order to generate x-rays, and the term anode typically refers to an aspect of an electrical circuit which may cause acceleration of electrons theretoward. Target 56 is attached to a shaft 61 supported by a front bearing 63 and a rear bearing 65. Shaft 61 is attached to a rotor 62. Cathode assembly 60 includes a flat emitter or filament 55 formed of any suitable emitter material and coupled to a current supply lead 71 and a current return 75 that each pass through a center post 51. In operation, electrical current is carried to flat emitter 55 via the current supply lead 71 and from flat emitter 55 via the current return 75 which are electrically connected to source controller 30 and controlled by computer 22 of system 10 in FIG. 2.

Feedthrus 77 pass through an insulator 79 and are electrically connected to electrical leads 71 and 75. X-ray tube 12 includes a window 58 typically made of a low atomic number metal, such as beryllium, to allow passage of x-rays therethrough with minimum attenuation. Cathode assembly 60 includes a support arm 81 that supports cathode cup 73, flat emitter 55, as well as other components thereof. Support arm 81 also provides a passage for leads 71 and 75.

In operation, target 56 is spun via a stator (not shown) external to rotor 62. An electric current is applied to flat emitter 55 via feedthrus 77 to heat emitter 55 and emit electrons 67 therefrom. A high-voltage electric potential is applied between anode 56 and cathode 60, and the difference therebetween accelerates the emitted electrons 67 from cathode 60 to anode 56. Electrons 67 impinge target 57 at target track 86 and x-rays 69 emit therefrom at a focal spot 89 and pass through window 58.

Figure 3A:
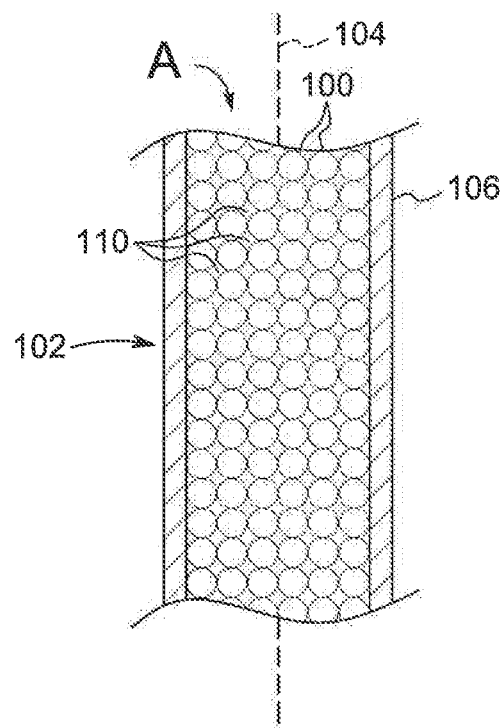
FIGS. 3A-3D are schematic views of different cross-sectional configurations for an assembly of wires prior to formation into a rod according to an exemplary aspect of the present disclosure.
Figure 3B:
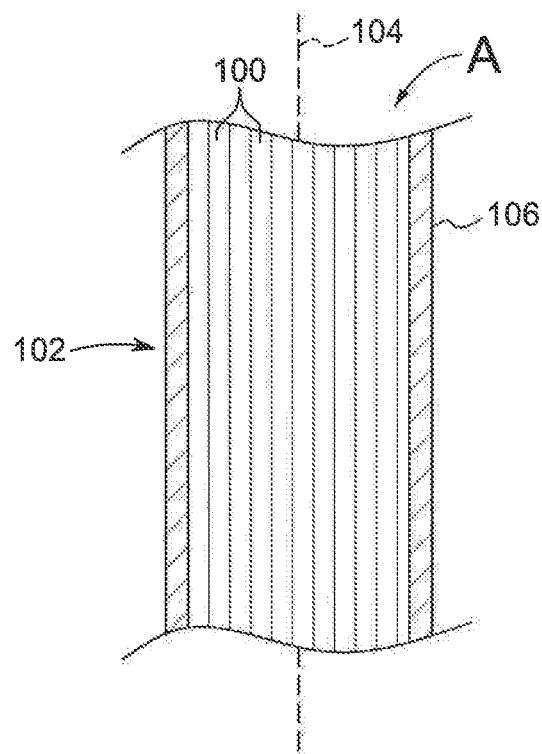
Figure 3C:
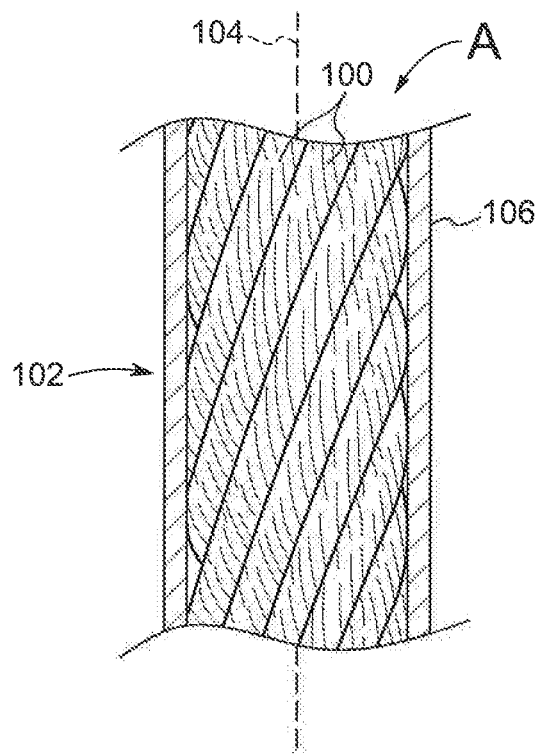
Figure 3D:
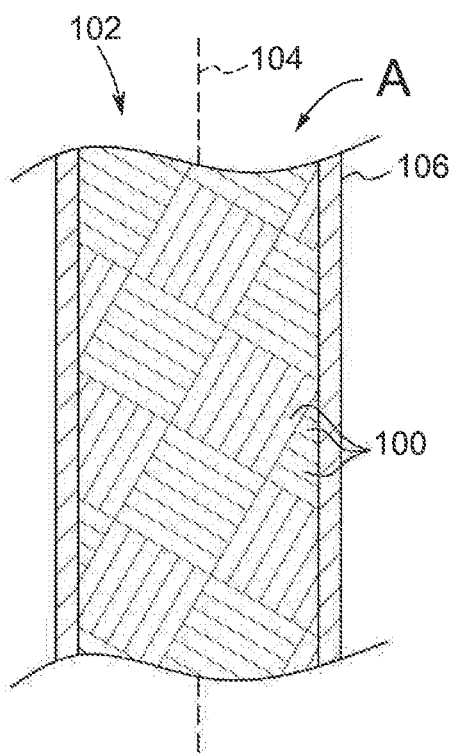

To form the emitter 55, looking at FIGS. 3A-3D, initially a preform A formed of an electron emitter material, such as tungsten or tantalum, is provided which in the illustrated embodiment includes a number of wires 100 formed into an assembly 102. The particular form, shape, work history and/or enhancement of the preform A can be selected as desired, and in the illustrated embodiment the arrangement or texture of the wires 100 within the assembly 102 can be selected as desired, and can include wires 100 running perpendicular to a central axis 104 of the assembly 102 (FIG. 3), parallel to the central axis 104 (FIG. 3B), in a rope or serpentine pattern relative to the central axis 104 (FIG. 3C), or at one or more angles with respect to the central axis 104 (FIG. 3D). The preform A e.g., wire 100 or assembly 102, and/or elements thereof, such as the wires 100, can additionally have any desired configuration and/or cross-section, such as round, square, rectangular, hexagonal, octagonal, etc. The wires 100 are held in the desired configuration within the assembly 102 in one exemplary embodiment by a suitable encapsulant or encapsulating material 106 such as tungsten, tantalum, niobium, hafnium, rhenium or any other material that is metallurgically compatible with the preform A and sufficiently malleable at the forming temperatures and pressures positioned around the wires 100 forming the assembly 102. However, in alternative embodiments the assembly 102 can he formed without the encapsulating material 106. Further, depending on the desired shape for the emitter 55, the assembly 102 can be formed with a desired cross-section corresponding to the shape of the emitter 55 to be formed. In the illustrated exemplary embodiments, the assembly 102 is formed with a circular cross-section, though rectangular cross-sections and cross-sections of other shapes are also contemplated as being within the scope of this disclosure.

Figure 4:
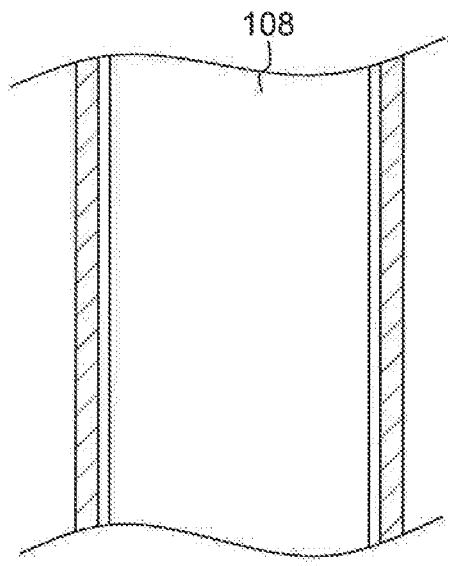
FIG. 4 is a schematic view of the cross-section of the assembly of wires of FIG. 3A after formation into the rod according to an exemplary aspect of the present disclosure.

The assembly 102 is the positioned within a suitable containment vessel (not shown) and subjected to selected temperatures and pressures in order to form a component, such as a rod 108 (FIG. 4) having any desired shape or configuration of the material constituting the wires 100 that has approximately the overall length and width of the assembly 102 of the wires 100. Due to the formation of the rod 108 from the wires 100 in the process through the application of sufficient temperature and pressure, the rod 108 eliminates internal voids and microporosity within the material forming the rod 108 through a combination of plastic deformation, creep, and diffusion bonding of the material. The consolidation method or process utilized to create the component or rod 108 from the preform A/assembly of wires 102 can be any suitable process or method for mechanical consolidation and/or forming including but not limited to hot rolling, hot extrusion, hot swaging, hot pressing, spark plasma sintering (SPS), hot forging, hot explosion bonding and hot isostatic pressing (HIP) among others.

In one exemplary embodiment of the invention using the hot isostatic pressing treatment or process, within the containment vessel the assembly 102 is subjected to temperatures between 600° C.-3000° C., and in other embodiments between 1000° C.-2500° C., and pressures sufficient to achieve consolidation of the wires 100 in the assembly 102, such as greater than approx, 5 ksi for HIP or flow stress above 50 MPa, while simultaneously having the pressure maintained in isostatic manner within the containment vessel against the entire exterior surface of the assembly 102. The pressures exerted against the assembly 102 can be generated by introducing a gas, such as an inert gas, into the containment chamber until the desired pressure within the chamber is reached. In this manner the desired pressure is exerted on all surfaces of the assembly 102 equally to achieve the desired effect in conjunction with the application of the desired temperature to the assembly 102. After completion of the process, the encapsulating material 106, which forms a skin around the assembly 102 and the resulting rod 108, can be removed for further processing of the rod 108.

In this manner, the hot isostatic pressing process alters the wires 100 within the assembly 102 by increasing the density of the rod 108 formed from the wires 100, thereby compressing the wires 100 into a solid component, e.g., the rod 108, while additionally eliminating the voids 110 (FIG. 3A) initially present between the wires 100 in the assembly 102. The hot isostatic pressing also enables the wires 100 to retain the enhanced high temperature thermomechanical properties and other properties obtained as a result of the working of the material in initially forming the wires 100. As such, the rod 108 includes the creep-resistance properties present in the wires 100 when formed in this manner, which in certain exemplary embodiment can be equivalent thermomechanical properties to the wire 100/preform A, e.g., the creep resistance, of the wires 100/preform A. Also, a rod 108 formed from the assembly 102 of wires 100 in the hot isostatic pressing process has porosity equivalent or approaching that of a conventionally formed flat sheet for use an emitter 55, in addition to the increased mechanical properties for the rod 108. Further, in various exemplary embodiments, the hot isostatic pressing process forms the rod 108 enables the rod 108 to have the increased creep-resistant properties without the need for any work function lowering material placed on the rod 108 or on any individual wires 100 utilized to form the rod 108.

Figure 5:
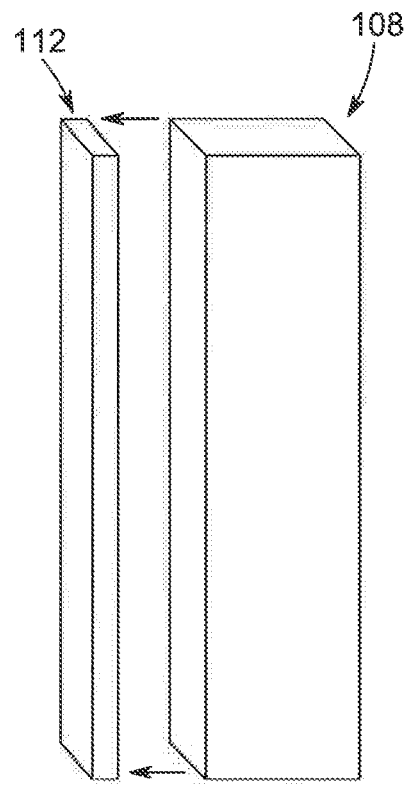
FIG. 5 is a schematic view of the rod of FIG. 4 being sliced into the individual sheets utilized to form a flat emitter according to an exemplary aspect of the present disclosure.

After formation of the rod 108 in the hot isostatic pressing treatment or other suitable process, the rod 108 can be sliced into sheets 112 that are ultimately utilized to form the emitters 55. As shown in FIG, 5, the rod 108 is separated into sheets 112 of the desired thickness using any suitable process, such as mechanical cutting or electrical discharge machining (EDM). The emitters 55 can then be cut directly from the sheets 112 in any suitable manner, such as by EDM or laser. While the exemplary embodiment of FIG. 5 shows the slices 112 being formed by cutting the rod 108 length wise along the length of the rod 108, thereby maintaining the orientation of the sheets 112 with the original orientation of the wires 100, and the consequent thermomechanical properties of the wires 100. However, other orientations of the slices 112 relative to the rod 108 or other component are contemplated as being within the scope of the invention.

In alternative embodiments of the processes used to form the sheets 112 from the preform A, such as the hot isostatic pressing process, eliminating gas between the elements of the preform A, e.g., the wires 100 in the assembly 102, enables consolidation and elimination of voids between the elements/wires 100. Further, the materials forming the wires 100 can be strengthened during their initial formation in order to enable the enhancements to the strength and/or thermomechanical properties of the wires 100 to be carried through to the sheet 112 formed from the wires 100 in the formation process. In some exemplary embodiments, these enhancements include, but are not limited to, oxide doping such as potassium-doped, alkali-doped, or dispersion of the refractory metal(s) forming the wires 100, such as lanthanum oxide dispersion, and/or carbide doping or dispersion of the refractory metal(s) forming the wires 100, such as hafnium carbide or zirconium carbide dispersion. In any embodiment of the assembly 102, the individual composite microstructure of the wires 100 forming the assembly 102 is retained within as the microstructure for the sheet 112 formed from the assembly 102. This provides significant benefits to emitters 55 that are formed from the sheet 112, as the tensile strength and creep resistance of potassium doped tungsten wires is much higher at elevated temperatures than that of a fiat sheet of potassium doped tungsten at the same temperatures. In one exemplary embodiment of the sheet 112, as doped tungsten wire is known to have dramatically better creep properties than doped tungsten sheet, due to better distribution and reduced size of the potassium bubbles, a wire 100 formed of that material can be drawn down to very small sizes, giving an even better distribution and size reduction of bubbles within the wire 100. This bubble distribution would be retained in the rod 108 and/or sheet 112 formed of the wires 100 in the formation process, such that a sheet 112 formed from the wires 100 in the process of the invention would have similar density to and better creep properties than a prior art rolled sheet.

Further, in another exemplary embodiment, after the formation of the rod 108 and/or the sheet 112 from the wires 100 in the selected process, the rod 108 and/or the sheet 112 can be subjected to additional mechanical working, such as extrusion, rolling and/or swaging, among other suitable processes. This added work to the rod 108 and/or the sheet 112 further increases the density of the sheet 112, and can further enhance the deformation of the microstructure of the material forming the rod 108 and/or the sheet 112, thereby further increasing the creep resistance of the material forming the rod 108 and/or the sheet 112.

Figure 6:
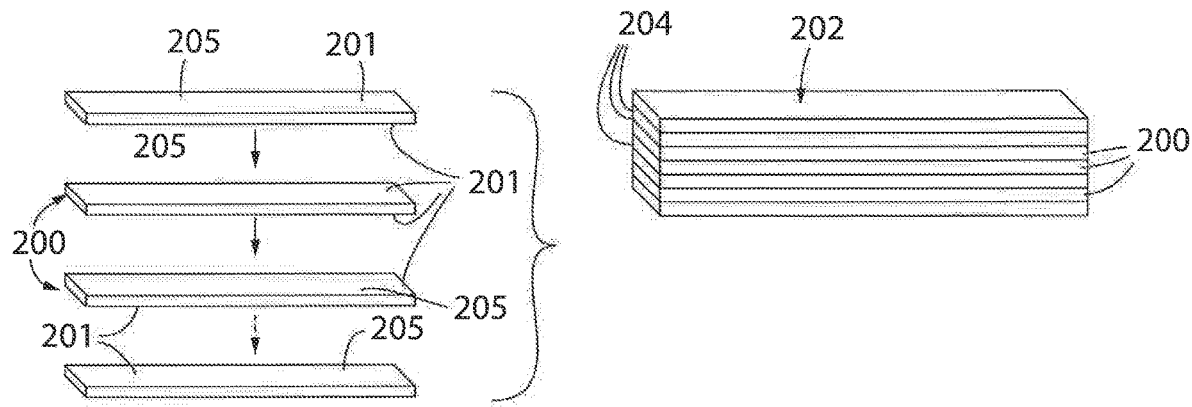
FIG. 6 is a schematic view of an assembly of sheets formed into an emitter preform/assembly according to an exemplary aspect of the present disclosure.
Figure 7A:
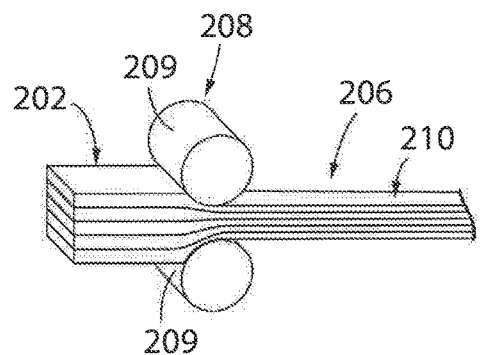
FIGS. 7A-7B are schematic views of various processes for mechanically working the emitter preform/assembly into an emitter according to exemplary aspects of the disclosure.
Figure 7B:
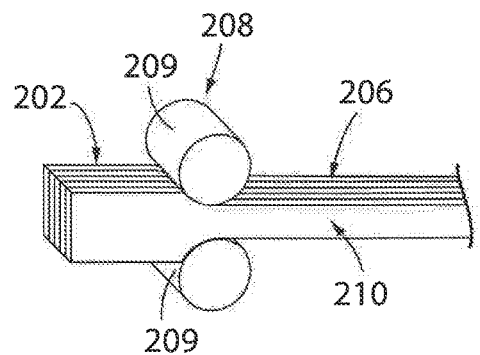

Referring now to FIGS. 6-7B, in still another exemplary embodiment of the disclosure, the preform A is formed from a number of sheets 200 each having a number of planar surfaces 201 and formed of an electron emitting material, such as tungsten or tantalum, or any other suitable emission material, that are positioned and formed into a non-porous and densely packed assembly 202. The sheets 200 can be initially or directly formed and/or cut from the selected emitter material, or can be formed from other components initially or directly formed form the emitter material. For example, the sheets 200 can be formed from wires 100 that are subjected to the prior exemplary process in FIGS. 3A-5 to form the highly worked sheet 112, which can subsequently be utilized as the sheet(s) 200.

To form the assembly 202, a number of sheets 200 are aligned and positioned immediately adjacent one another, with similarly shaped planar surfaces 201 disposed against one another, as illustrated in the exemplary embodiment of FIG. 6. The individual sheets 200 are each formed to have any desired length and width, such as to form a rectangular cross-sectional area sheet or ribbon as shown in the exemplary embodiment of FIG. 6. Regardless of the cross-sectional area, the individual sheets 200 are additionally formed with a thickness less than that of the desired thickness of an emitter 55 formed from the sheets 200 in the assembly 202, e.g., less than 200 µm or in other embodiments, less than 100 µm. In other exemplary embodiments, the sheets 200 can have thicknesses, and optionally varying thickness between individual sheets 200, of down to 10 µm, with multiple sheets 200 having a thickness less than that of the resulting emitter 55 being formed into the assembly 202. A plurality of sheets 200 can be formed into one or more assemblies 202 having a thickness of more than 30 µm, more than 100 µm or more than 200 µm, or other thicknesses, as desired. The number of individual sheets 200 utilized to form the assembly 202 can be selected as desired and in certain exemplary embodiments the number of sheets 200 provides a thickness for the assembly 202 that exceeds the desired thickness for the resulting emitter 55. Thus, upon further processing of the assembly 202, in a manner to be described, the thickness of the assembly 202 will be reduced during processing to that of the desired thickness for the emitter 55. Further, in order exemplary embodiments, multiple assemblies 202 of sheets 200 can be formed in which each assembly 202 has a thickness less than that for a single assembly 202. In this embodiment, each individual assembly 202 is individually processed and then the individual assemblies 202 are joined in the manner described below or otherwise combined into a single assembly 202 for further processing into the desired thickness for the emitter 55. Further, the use of sheets 200 to form the assembly 202 results in a significant increase in packing density of the assembly 202 as there is a significant reduction in voids (not shown) formed between the adjacent sheets 200 as a result of the shape of the individual sheets 200.

In forming the one or more assemblies 202, the individual sheets 200 are positioned in alignment with one another as shown in FIG. 6 and are subsequently bonded to one another in order to maintain the alignment of the sheets 200 in the assembly 202. The manner in which the sheets 200 can be bonded can be in any suitable manner, such as by utilizing HIP, brazing using a suitable filler material, such as rhenium or molybdenum, for example, spot welding the sheets 200 to one another, such as by ultrasonic, laser, or tig welding, among other suitable welding methods, welding the edges of the sheets 200 to one another using any of the aforementioned welding methods, diffusion bonding the sheets 200, such as by firing the assembly 202 of sheets 200 at 2000° C., and/or mechanically roll bonding the sheets 200 to form the assembly 202, among other suitable methods.

With regard to the methods for bonding the sheets 200 to one another to form the assembly 202, in other exemplary embodiments a work function lowering material 205 can be added within the interstitial layer 204 between adjacent sheets 200 in any suitable manner, such as by coating the material 205 onto the sheets 200. In these embodiments, examples of work lowering materials suitable for use include thoria, ytttria, thorium, hafnium, hafnium carbide, or carbon, such as in the form of carbon nano-tubes, among others.

Once the sheets 200 have been bonded to one another in order to form the assembly 202, the assembly 202 can be subjected to a consolidation process where the assembly 202 is mechanically worked in order to provide a highly worked, creep resistant material 206. As shown in the exemplary embodiment illustrated in FIGS. 7A-7B, the consolidation or processing of the assembly(ies) 202 can take the form of mechanically working the assembly(ies) 202 to increase the mechanical work in the resulting material 206. In particular, the assembly 202 can be rolled utilizing a suitable mechanical compression device 208 including a pair of opposed rollers 209 that deforms the assembly 202 in a direction that is parallel (FIG. 7A) to the wide face 210 of the assembly 202, in a direction that is perpendicular (FIG. 7B) to the wide face 210, or a combination of subsequent compressions in both directions. With this processing, the mechanical work introduced into the resulting material 206 improved the microstructure of the materials 206, such as by elongation of the grains (not shown) and bubbles (not shown) within the material 206 to potentially achieve 100x deformation history per iteration of this process, which correspondingly far improves the properties of the material 206, including but not limited to creep resistance. Further, in exemplary embodiments where work function lowering materials are applied to the sheets 200 prior to forming the sheets 200 into the assembly 202, it is particularly advantageous to successively roll the assembly 202 perpendicular to the wide face 210 (FIG. 7B) to improve the opportunity for these materials to migrate to the emission surface/wide face 210. Also, if structurally it is desired to stop the working of the assembly 202 prior to reaching the opposite end, it is more beneficial to successively work or roll the assembly parallel to the wide face (FIG. 7A), The material 206 is iteratively rolled in this manner using one or both of the mechanical working/rolling, techniques, or another suitable technique to reduce the thickness and/or size of the material 206 to the desired dimensions for the emitter 55. In one particular exemplary embodiment of the disclosure, an assembly 202 is formed from thirty (30) or more sheets 200 that can either be formed into a single assembly 202, or which can be formed into a number of separate assemblies 202, each including the same or a different number of sheets 200, therein. The sheets 200 are each formed with a thickness of 10 µm to provide an overall thickness to the assembly 202 of 300 µm. The assemblies 202 are mechanically worked in the manner described previously, and in the case of the separate assemblies 202 are worked to achieve a sufficient reduction in thickness prior to combination with one another for additional subsequent working as a single assembly 202, to achieve an emitter material 206 having a thickness suitable for use in an emitter 55. Once achieved, the material 206 can be cut or otherwise shaped or formed into the desired configuration or shape for the emitter 55 with the work history for the material 206 forming the emitter 55 providing enhanced life and creep resistance.

Figure 8:
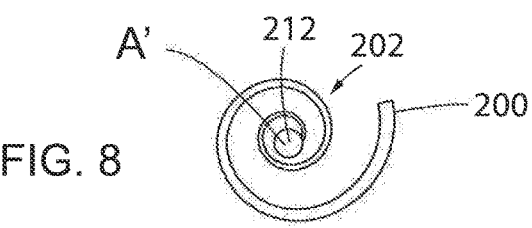
FIG. 8 is a schematic view of an assembly of a wound sheet formed into an emitter preform/assembly according to an exemplary aspect of the present disclosure.

In exemplary alternative embodiments illustrated in FIG. 8, the assembly 202 can be formed from a single sheet 200, where the sheet 200 is formed to have a spiral configuration. The sheet 200 can be wrapped around a central rod 212 to provide a template for the spiral shape of the sheet 200 as the sheet 200 is wound about the rod and itself to achieve the desired thickness for the assembly 202. To work the assembly 202 formed in this manner, the rod can optionally be removed, and the assembly 202 is subject to mechanical working along the length of the assembly 202, optionally with multiple iterations of mechanical working and optionally with the assembly 202 being rotated relative to a central axis A' of the assembly 202 between successive mechanical working cycles.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for forming an electron emitter with enhanced creep-resistant properties for an x-ray tube comprising the steps of:
    providing a plurality of planar sheets formed of an electron emitting material in an assembly; and
    subjecting the assembly to a consolidation process to form the electron emitter.

2. The method of claim 1, wherein the plurality of sheets arc each formed from a number of consolidated wires formed of an electron emitting material.

3. The method of claim 1 further comprising the step of joining the plurality of sheets to form the assembly prior to subjecting the assembly to the consolidation process.

4. The method of claim 3, wherein the step of joining the plurality of sheets comprises brazing the plurality of sheets to one another.

5. The method of claim 3, wherein the step of joining the plurality of sheets comprises welding the plurality of sheets to one another.

6. The method of claim 5, wherein the step of welding the plurality of sheets comprises spot welding the plurality of sheets to one another.

7. The method of claim 3, wherein the step of joining the plurality of sheets comprises diffusion bonding the plurality of sheets to one another.

8. The method of claim 3, wherein the step of joining the plurality of sheets comprises roil bonding the plurality of sheets to one another.

9. The method of claim 3, wherein the step of joining the plurality of sheets comprises hot isostatic pressing the plurality of sheets to one another.

10. The method of claim 1, wherein the assembly includes a work function lowering material added between the plurality of sheets.

11. The method of claim 1, wherein the step of subjecting the assembly to the consolidation process comprises mechanically working the assembly in at least one direction.

12. The method of claim 11, wherein the step of mechanically working the assembly comprises compressing the assembly in a direction parallel to a wide Lace of the assembly.

13. The method of claim 11, wherein the step of mechanically working the assembly comprises compressing the assembly in a direction perpendicular to a wide face of the assembly.

14. The method of claim 11, wherein the step of mechanically working the assembly comprises compressing the assembly in directions perpendicular and parallel to a wide face of the assembly.

15. A method for forming an electron emitter for an x-ray tube having enhanced creep-resistant properties comprising the steps of:
    providing a plurality of sheets of an electron emitting material;
    joining the plurality of sheets to form an assembly;
    subjecting the assembly to a consolidation process to form an emitter material; and
    shaping the emitter material to form the electron emitter.

16. The method of claim 15 wherein the step of shaping the emitter material for form the electron emitter comprises cutting the emitter material to form the electron emitter.

17. The method of claim 15, wherein the step of joining the plurality of sheets to form the assembly comprises:
    forming a first assembly with a first subset of the plurality of sheets;
    subjecting the first assembly to a consolidation process;
    forming a second assembly with a second subset of the plurality of sheets;
    subjecting the second assembly to a consolidation process; and
    joining the first assembly to the second assembly.

18. The method of claim 15, wherein the plurality of sheets have a combined thickness greater than 30 100 μm.

19. An electron emitter with enhanced creep-resistant properties for an x-ray tube comprising:
    an assembly of sheets having a defined creep-resistance, each sheet including at least one component formed of an electron emitting material,
    wherein the electron emitting material is a refractory metal.

20. An electron emitter with enhanced creep-resistant properties for an x-ray tube comprising;
    an assembly of sheets having a defined creep-resistance, each sheet including at least one component formed of an electron emitting material
    wherein the electron emitter includes a work function lowering material.

* * * * *

UNITED STATES PATENT AND TRADEMARK OFFICE
CERTIFICATE OF CORRECTION

PATENT NO. : 10,529,526 B2
APPLICATION NO. : 16/193336
DATED : January 7, 2020
INVENTOR(S) : Andrew Marconnet et al.

Page 1 of 1

It is certified that error appears in the above-identified patent and that said Letters Patent is hereby corrected as shown below:

In the Claims

Claim 12, Column 12, Line 15, delete "Lace" and substitute therefore -- face --;

Claim 16, Column 12, Line 34, delete "for" and substitute therefore -- to --.

Signed and Sealed this
Twenty-third Day of June, 2020

Andrei Iancu
*Director of the United States Patent and Trademark Office*